H. T. VADERS.
Water-Filters.
No. 153,406.  Patented July 21, 1874.
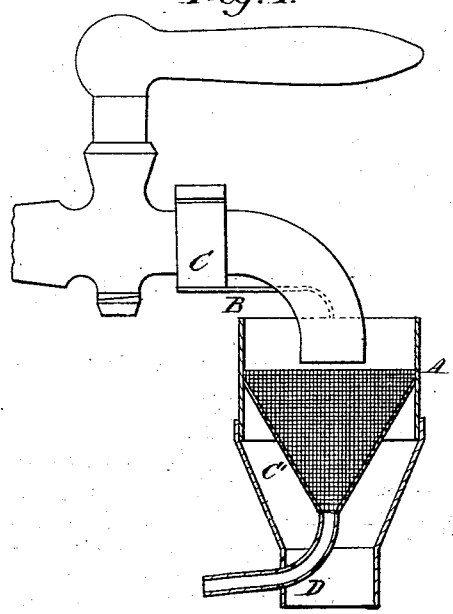
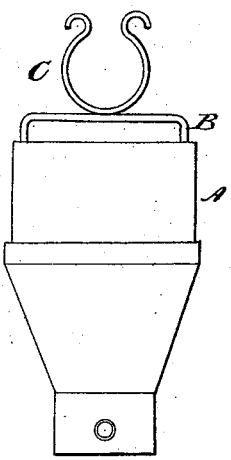

UNITED STATES PATENT OFFICE.

HENRY T. VADERS, OF LANSDALE, PENNSYLVANIA, ASSIGNOR OF ONE-HALF HIS RIGHT TO JACOB BEAVER, OF SAME PLACE.

IMPROVEMENT IN WATER-FILTERS.

Specification forming part of Letters Patent No. 153,406, dated July 21, 1874; application filed June 15, 1874.

*To all whom it may concern:*

Be it known that I, HENRY T. VADERS, of Lansdale, in the county of Montgomery and State of Pennsylvania, have invented a certain new and useful Improvement in Water-Filters; and I do hereby declare the following to be a full, clear, and exact description of the invention, such as will enable others skilled in the art to which it pertains to make and use it, reference being had to the accompanying drawings, which form part of this specification, in which—

Figure 1 a vertical central section, and Fig. 2 a side view, of my invention.

The object of this invention is to provide a self-cleaning water-filter, which may be applied to the nozzle of a hydrant or other conductor and convey purified liquid to a pail beneath or other receiver. This invention then consists in the novel construction of an open vessel containing a conical filter-screen, which communicates at the bottom with an outlet-tube, and having an open spring-clamp to be secured to the nozzle from which the water is drawn, all as hereinafter more fully described.

Referring to the accompanying drawings, A designates a funnel, provided with arms B, holding a spring-clamp, C, which may be readily applied to a nozzle or outlet-pipe. The arms B proceed from a central point of the funnel, so as to hold the latter in a proper position. C' designates a conical filter-screen attached to the inner surface of the funnel, and communicating at its lower end with a pipe, D, leading back through the wall of the funnel. The object of said pipe is to convey from the filter the impurities of the water which pass down its inclined sides and are carried off beyond the receiving-vessel.

Having described my invention, I claim—

1. The funnel A, conical filter-screen C', and outlet-pipe communicating with the latter, combined substantially as described.

2. In combination with the self-cleaning filter, as described, the arms B and open spring-clamp C, as shown and described.

In testimony that I claim the oregoing I have hereunto set my hand this 22d day of May, 1874.

HENRY T. VADERS.

Witnesses:
 THOS. A. CONNOLLY,
 M. DANL. CONNOLLY.